Feb. 20, 1934. W. P. FROST 1,947,708
STRAIN EQUALIZING DEVICE
Filed Sept. 26, 1931  3 Sheets-Sheet 2
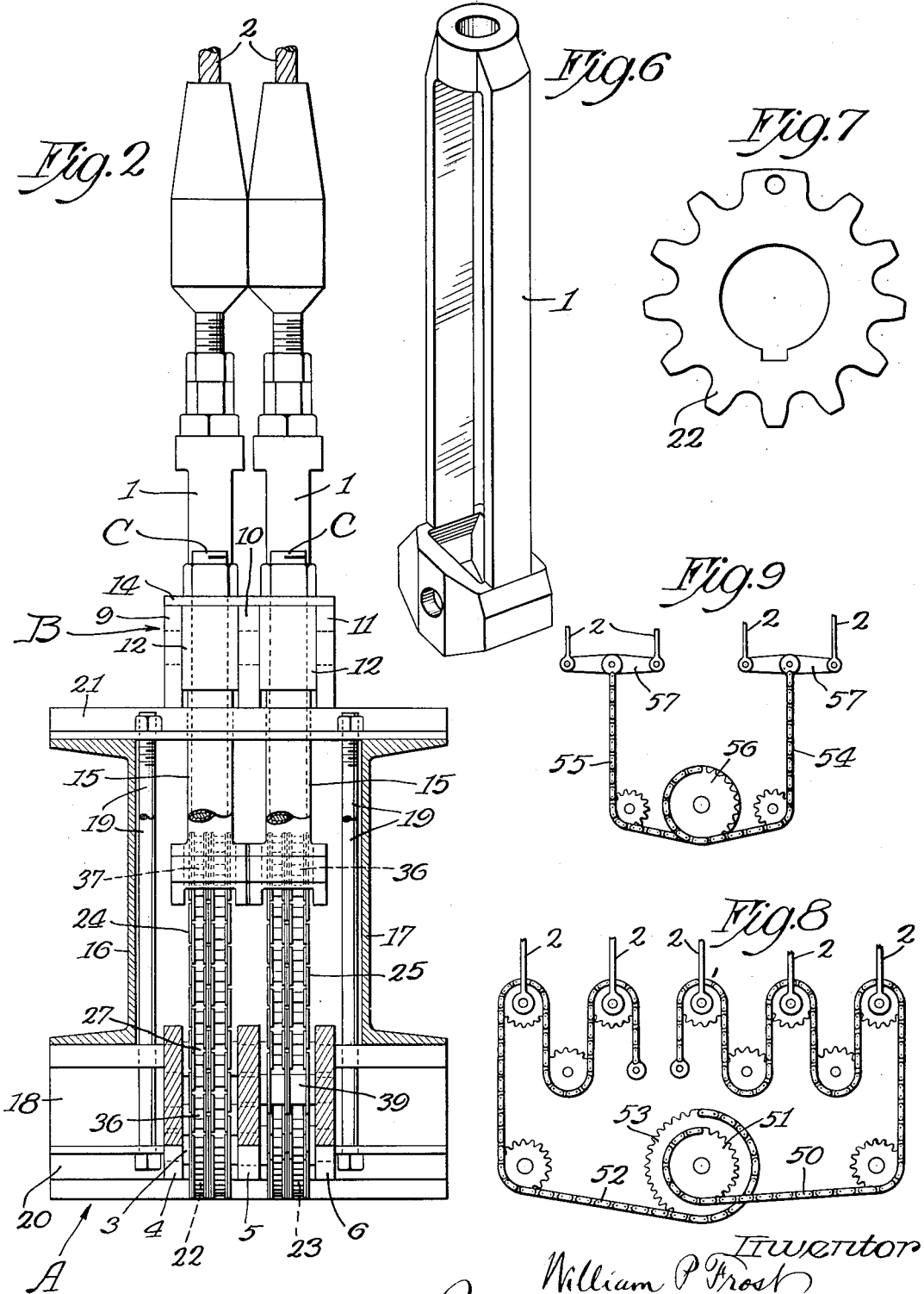

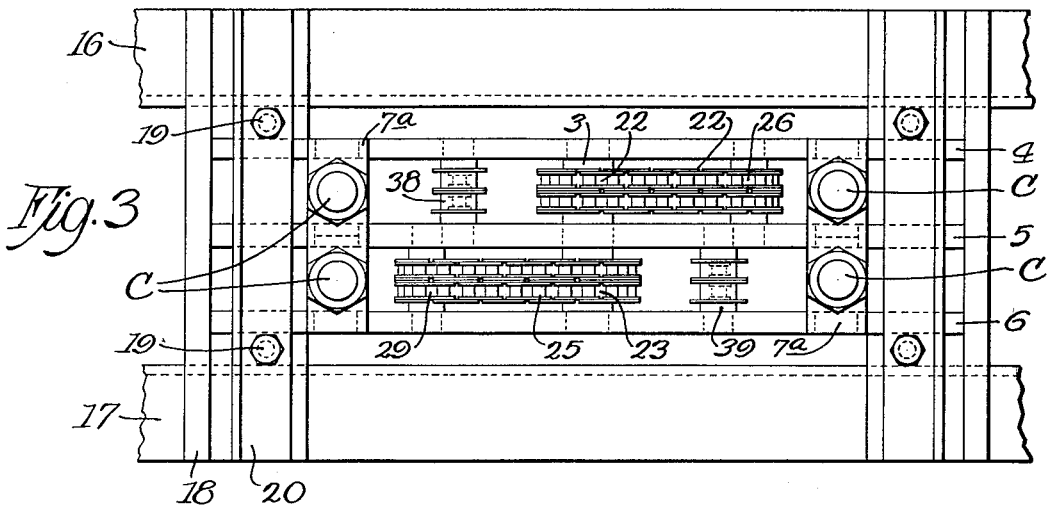
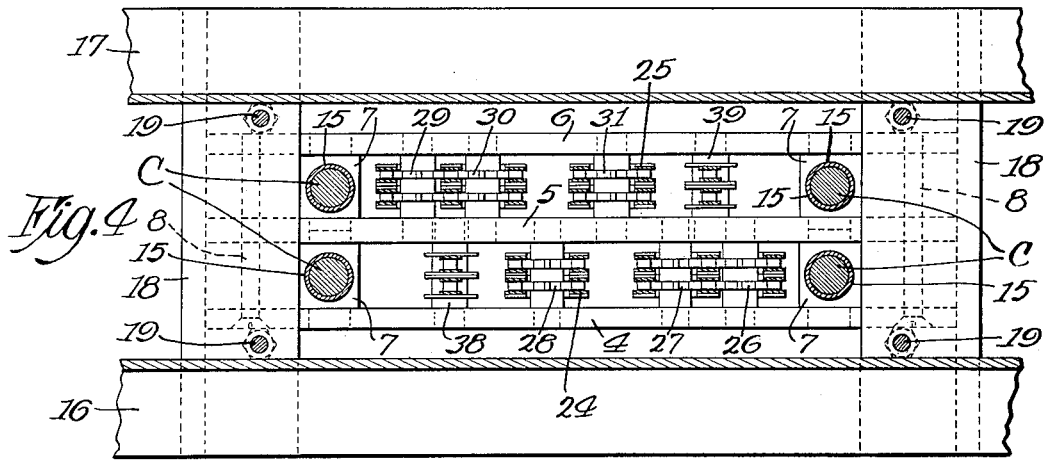
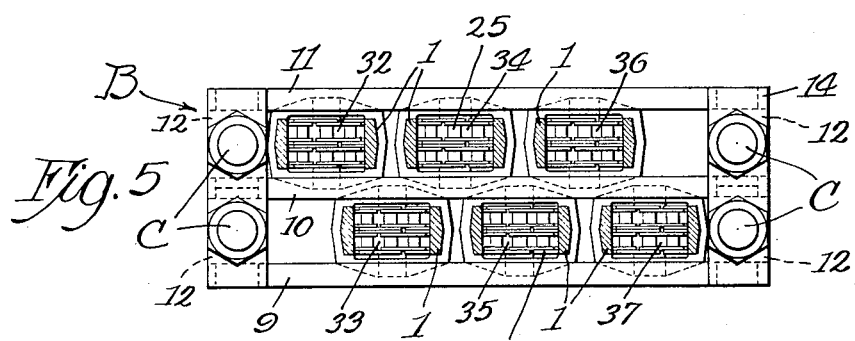

Patented Feb. 20, 1934

1,947,708

UNITED STATES PATENT OFFICE 1,947,708

STRAIN EQUALIZING DEVICE

William P. Frost, Jackson Heights, N. Y., assignor to Evans Elevator Equalizer Company, Bedford, Ind., a corporation of Indiana Application September 26, 1931
Serial No. 565,223

9 Claims. (Cl. 187—1)

My invention relates to a strain equalizing device designed to connect under tension a group of cables or other separate tension elements and a single connected part, and to distribute the strain to which the connection is subjected equally between the single part, which may be termed the load, and the members of the group of separate tension elements. In the embodiment of my invention illustrated in the drawings and hereinafter described, I have shown my invention applied to a group of hoisting cables connected to an elevator car of the type in universal use for transferring passengers or freight from one floor of a building to another, although it is equally well adapted for use in connecting the counterweight of such a car with the cables, and may be used for various other purposes where it is desired to distribute the weight of a load, or an applied stress,—the term "load" being employed in the claims to embrace all equivalents thereof,—equally between a plurality of connected stress-sustaining elements to produce uniform distribution of forces, as for instance between a plurality of brake elements.

Equalizing devices of different types having the general purpose and adapted for the use indicated are known, and the object of my present invention is the production of an equalizing device having certain features of original design and novel construction which adapt it particularly well to the uses for which it was intended, among which it may be mentioned are a novel organization and arrangement of the equalizing members; the use of a linked metal chain as an equalizing connecting member, which affords greater sensitiveness and flexibility and less inherent frictional resistance to change in position of the parts than a stranded steel cable, such as employed in prior devices of this kind; compactness in construction due to the fact that pulleys or sprocket wheels of smaller diameter may be employed with a chain than the sheaves used with cables, this compactness also providing for a maximum of differential movement of the portions of the chain between the sprocket wheels within a given space; and relatively great strength as compared with a cable equalizer of corresponding dimensions. In addition to this the device has the individual advantage of being so constructed and assembled that it can be handled as a complete unit and readily installed as such upon an elevator car. In the appended claims I have more particularly pointed out the essential elements of my invention, but it will be understood that I intend to include within their scope mechanical equivalents of the particular parts described, and such modifications of construction as fall within the true scope and spirit of my invention, broadly considered.

In the drawings, Fig. 1 is what I will term a side view of my device;

Fig. 2 is an end view of the same, certain parts being broken away to afford a view of parts beyond;

Fig. 3 is a bottom plan view of the device;

Fig. 4 is a horizontal section in a plane indicated by the dotted line 4—4 of Fig. 1;

Fig. 5 is a horizontal section in a plane indicated by the dotted line 5—5 of Fig. 1;

Fig. 6 is a detail showing in perspective the construction of one of a set of pull-bars employed in my device;

Fig. 7 is a detail showing the construction of a pair of twin sprocket wheels forming a part of the equalizing connections of the device;

Fig. 8 is a semi-diagrammatic view illustrating a modified form of invention applied to an elevator installation employing five hoisting cables; and Fig. 9 is another semi-diagrammatic view illustrating a different modification of my invention applied to an elevator installation in which four hoisting cables are employed.

Like reference characters indicate like parts in all the figures of the drawings.

Figure 1:
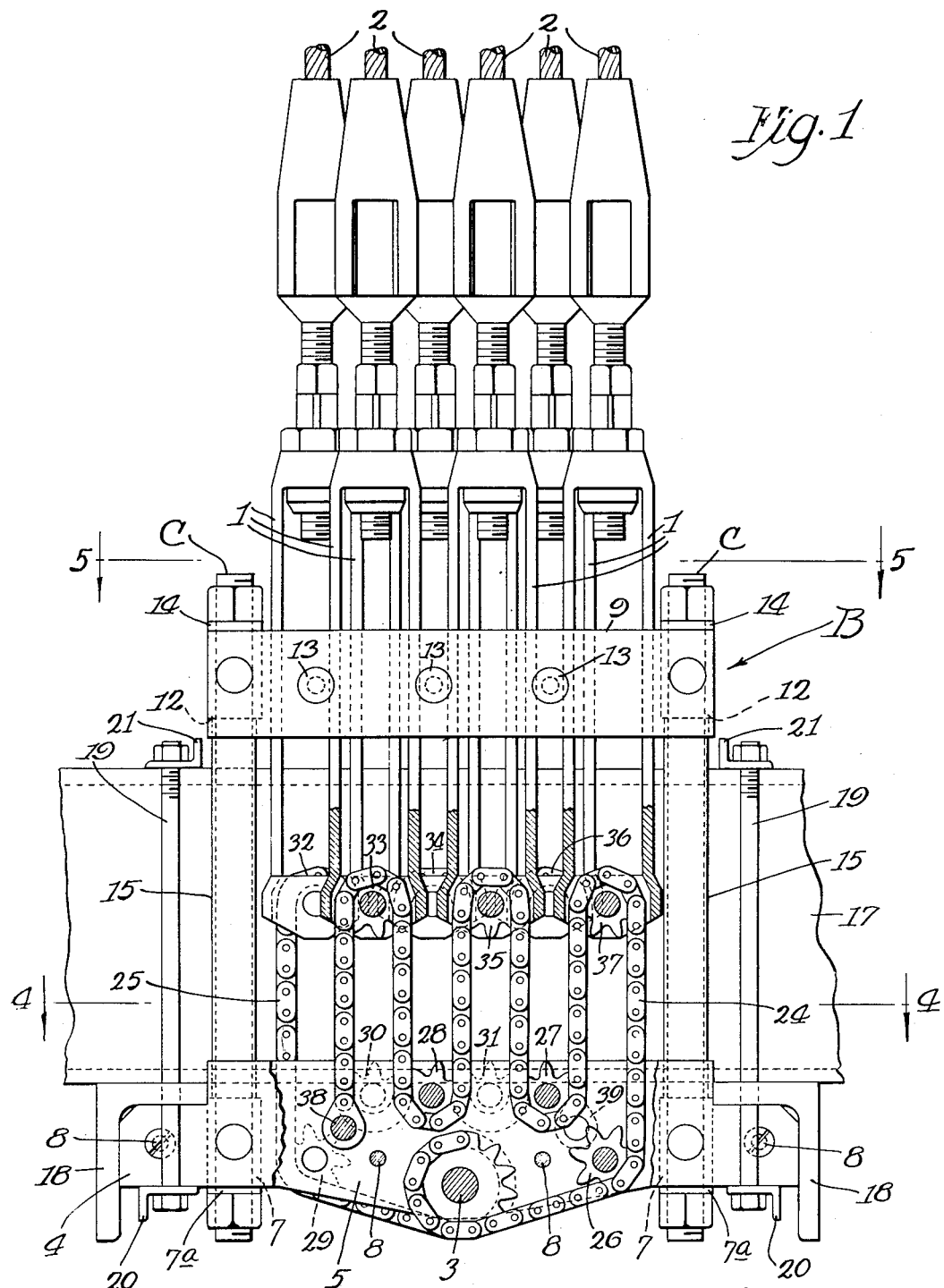

The framework of the device may conveniently be of the composite construction hereinafter described in detail, though it will be understood that this portion of my invention is susceptible of considerable variation. In the present instance this framework includes a lower bearing plate assembly in which the stationarily-mounted equalizer pulleys are rotatably mounted, and which as a whole, I will term a bearing block, marked A, as a convenient designation for that portion of the device providing a bearing for the pulleys, whether constructed in one part or several, and an upper composite member B, which I will term a safety frame, connected by frame bolts C, four in number. The safety frame serves as a stop element in case of breakage of a cable, and also serves as a guide for a set of pull bars 1 which at their upper ends are severally connected to the hoisting cables 2 of the elevator car and at their lower ends pivotally support floating pulleys engaged by the two equalizing chains later to be described.

Proceeding now to a more specific description of the framework, the bearing block A consists of three parallel bearing plates which may be conveniently termed a front plate 4, an inner plate 5, and a rear plate 6, and which are spaced apart by trunnion blocks 7 and are tied together by tie bolts 8. The trunnion blocks 7, four in number, are vertically orificed to severally receive the frame bolts 6, and are formed with trunnions or reduced cylindrical side portions arranged to engage seats in the contiguous bearing plates. Below the bearing plates adjacent the ends thereof and in the path of the frame bolts 6, are arranged opposite orificed clamping plates 7a arranged to be engaged by nuts on the ends of the frame bolts. The safety frame B likewise includes three parallel plates 9, 10 and 11, spaced apart by vertically orificed trunnion blocks 12 adjacent the ends of the plates, similar in construction to the trunnion blocks 7. The plates of this frame are tied together by the bolts 13 which serve to space and guide the pull bars 3 before referred to. These tie bolts are arranged in two groups of three bolts each, arranged in staggered relation, the bolts of one group extending on one side of the center plate to the outer plate on that side, and the other bolts being oppositely arranged. Extending above the set of plates at each end is a transverse clamping plate 14, orificed to receive the frame bolts 6. Surrounding each frame bolt and interposed between the particular trunnion block 7 at the bottom and the trunnion block 12 at the top is a pipe spacer 15, which serves to take up the strain of the nuts at top and bottom of the frame bolts and enables the plates of the bearing block and of the safety frame to be firmly clamped to the frame bolts in spaced relation.

This equalizer frame is in the present instance arranged to be secured to the car between two frame members 16 and 17 which may be of channel iron, as shown, forming part of the framework of the car and extending parallel with the plates of the bearing block A a sufficient distance apart to receive the block. To this end I provide transversely disposed two cover supporting plates 18—18 of angle iron at the opposite ends of the block having each a horizontal top flange extending over the top of the adjacent end of the frame plates and at their ends engaging the lower faces of the channel iron car-frame members 16 and 17. These supporting plates are orificed to receive fastening bolts 19 which at their lower ends engage orificed lower clamping plates 20 extending parallel with the supporting plates 18 underneath the ends of the frame plates 4, 5 and 6, and at their upper ends engage parallel orificed clamping plates 21 bearing on the upper faces of the members 16 and 17, and which serve to secure the bearing block and supporting plates in proper spaced relation to the car-frame members.

It may here be noted that elevator cars as ordinarily constructed are provided with top frame members such as the channel iron frame members 16 and 17 illustrated, although the distance apart of such members varies in cars of different styles and makes. By the use of sets of supporting plates and associated upper and lower clamping plates of appropriate length and such spacing members as may be required, therefore, my equalizing device, assembled as a complete unit and including the framework and parts later to be described, may be readily installed in elevator cars varying in the spacing of their top frame members.

Describing next the chain and sprocket connection by which the car is connected to the hoisting cables, there are journaled in the outer bearing plates 4 and 6 of the bearing block the pivot end sections of what I will term a transfer shaft, marked 3, which extends through the inner plate 5 and to which are secured a pair of twin sprocket wheels 22 and 23, one on each side of the inner bearing plate,—see Fig. 6. These wheels are oppositely connected, as will shortly be explained, and for distinction from other wheels may conveniently be designated as opposed wheels or pulleys.

Each sprocket wheel is formed with a peripheral block portion arranged to be connected to the end of a sprocket chain by a link pin or in other suitable manner, one chain marked 24, being arranged to engage the wheel 22 and extending around said wheel in one direction (in anti-clockwise direction as shown in Fig. 1), and the other, marked 25, being arranged to engage the sprocket wheel 23 and extending around such wheel in the opposite direction. The chains preferably are of compound construction, such as the well-known Baldwin double chain and sprocket shown, to attain maximum strength and efficiency. Journaled in bearings in the front plate 4 and inner plate 5 are three sprocket wheels or pulleys 26, 27 and 28, and journaled in bearings between the inner plate 5 and rear plate 6 are three other sprocket wheels 29, 30 and 31, similar in construction and similarly arranged but in reverse order.

The hoisting cables 2 of the elevator apparatus may conveniently be connected to the pull-bars 1 by thimble-sockets and threaded shackle bolts which provide a certain amount of lengthwise adjustment. As illustrated in Fig. 6, the pull bars are formed with a centrally orificed cross portion at the top providing for connection with the shackle bolts, a twin-link intermediate portion, and a recessed cross portion or block at the bottom of the link, the sides of which provide a bearing for the floating pulleys or sprocket wheels before mentioned, marked 32, 33, 34, 35, 36 and 37, reading from left to right in Fig. 1. In case of breakage of one of the equalizing chains hereinafter described, the three floating pulleys and the pull bars in which these are mounted will rise relatively to the other three and bring up against the safety frame B, and if both chains should break, the weight of the car will be entirely supported by said frame.

The sprocket chain 24 (see Figs. 1, 2 and 3), from its point of connection and engagement with front sprocket wheel 22 on the transfer shaft engages in alternation the stationarily mounted and floating pulleys 26, 37, 27, 35, 28 and 33, and is anchored at its outer end to a cross pin 38 fixed to the front and inner plates of the bearing block, while the oppositely extending chain 25 engages in turn the pulleys 29, 32, 30, 34, 31 and 36 and is similarly anchored at its outer end to a cross pin 39 fixed to the rear and inner plates of the bearing block. The pulleys 26 and 29, it will be noted, function as guide pulleys to chain the direction of strain on the chains from a substantially horizontal to a vertical direction. Manifestly, the load on the three hoisting cables connected to the floating pulleys 32, 34 and 36, which engage loops of the chain 25, will tend to rotate the transfer shaft in a clockwise direction, while the load sustained by the pulleys 33, 35 and 37, engaged by the chain 25, will be in the opposite direction, and the freely rotating connection will permit the chains to move in one direction or the other, while in any position the total stress upon the two chains will be equally divided. The looped arrangement of the chain 24 permits the pulleys 37, 35 and 33 to shift vertically with respect to each other while at all times sustaining an equal part of the load on the three pulleys, and in like manner the pulleys 32, 34 and 36 will each carry an equal portion of the load on those three pulleys. The strain of the six hoisting cables will, therefore, be completely equalized while the cables will be free to travel at slightly different speeds up and down, due to inequality in the size of the cables or in the diameter of the grooves in the hoisting drum (not shown), or to differences in the stretch of the cables.

It will be understood that while I preferably employ metal link chains and sprocket wheels as equalizing elements, and regard the use of such members as an important part of my invention for attaining certain advantages hereinbefore mentioned, yet the novel organization and arrangement of parts above described may be employed in an equalizing device in which other forms of running tension connection, as stranded cables or belts, and appropriate pulley elements are substituted for the chains and sprocket wheels described. In the claim I have, therefore, employed the terms "pulley" and "cable" in a generic sense, inclusive of all functional equivalents.

It will further be understood that by the use of a greater or less number of floating and stationarily-mounted pulleys my invention may be applied to an elevator construction employing more, or less, than six cables, either an even number, or uneven. In case an uneven number of hoisting cables, as for instance five, are employed, the two pulleys on the transfer shaft are of unequal size, in order that the rotative stress of the larger number of hoisting cables connected to one chain may just balance the stress of the smaller number of cables connected to the other chain, as diagrammatically illustrated in Fig. 8, in which the chain 50 engaging the sprocket wheel 51, is connected to three hoisting cables 2, while the chain 52, engaging the sprocket wheel 53 of larger diameter is connected to two hoisting cables 2.

It will further be understood that the twin chain construction above described may be used in connection with equalizing bars connected to pairs of hoisting cables, such as the equalizing bar construction described in Evans Nos. 1,442,060 and 1,550,353; as shown in Fig. 9, in which I have illustrated diagrammatically the elements of a suspension device in which the two chains 54 and 55 (engaging twin sprocket wheels 56) are connected to four hoisting cables 2 by means of two equalizer bars 57.

I claim:

1. In an equalizing device for connecting a load and a plurality of stress-sustaining parts, a pair of opposed pulleys rigidly connected together and pivotally connected to said load, and a pair of running tension members severally anchored to and engaging said pulleys in opposite directions and also severally anchored at their other ends to said load, and a plurality of floating pulleys severally connected to said stress-sustaining parts, one of said tension members being arranged to engage in a loop at least one of said floating pulleys and the other tension member being arranged to similarly engage the remaining floating pulleys.

2. In an equalizing device for connecting a load and an even number of stress-sustaining parts, a pair of opposed pulleys of the same size rigidly connected together and pivotally connected to said load, a pair of running tension members severally anchored to and engaging said pulleys in opposite directions and also severally anchored at their other ends to said load, and an even number of floating pulleys severally connected to said stress-sustaining parts, one of said tension members being arranged to engage in loops one-half of said floating pulleys and the other tension member being arranged to similarly engage the other floating pulleys.

3. In an equalizing device for connecting a load and a plurality of stress-sustaining parts and having a bearing block secured to said load, a transfer shaft pivoted in said block, a pair of opposed pulleys secured to said shaft, a pair of oppositely arranged running tension members severally anchored at one end to and engaging said opposed pulleys and at the other end anchored to said block, a plurality of floating pulleys severally connected to said stress-sustaining parts, one of said tension members being arranged to engage in a loop at least one of said floating pulleys and the other tension member being arranged to similarly engage the remaining floating pulleys.

4. In an equalizing device for connecting a load and a plurality of stress-sustaining parts and having a bearing block secured to said load, a transfer shaft pivoted in said block, a pair of opposed pulleys rigidly secured to said shaft, a pair of oppositely arranged running tension members severally anchored at one end to and engaging said opposed pulleys and at the other end anchored to said block, a plurality of floating pulleys severally connected to said stress-sustaining parts, and a plurality of other pulleys journaled in said block, one of said tension members being arranged to engage in alternation a part of said floating pulleys and a part of said other pulleys and the other tension member being arranged to similarly engage the remainder of said floating pulleys and said other pulleys.

5. In an equalizing device for connecting a load and a plurality of stress-sustaining parts and having a bearing block secured to said load, a transfer shaft pivoted in said block, a pair of opposed pulleys of different diameters rigidly secured to said shaft, a pair of oppositely arranged running tension members severally anchored at one end to and engaging said opposed pulleys and at the other end anchored to said block, a plurality of floating pulleys severally connected to said stress-sustaining parts, and a plurality of other pulleys journaled in said block, one of said tension members being arranged to engage in alternation more than one-half of said floating pulleys and more than one-half of said other pulleys and being connected to the opposed pulley of smaller diameter and the other tension member being arranged to similarly engage the remainder of said floating pulleys and said other pulleys and being connected to the opposed pulley of larger diameter.

6. In an equalizing device for connecting a load and a plurality of stress-sustaining parts and having a bearing block secured to said load, a transfer shaft pivoted in said block, a pair of opposed sprocket wheels rigidly secured to said shaft, a pair of oppositely arranged chains severally anchored at one end to and engaging said sprocket wheels and at the other end anchored to said block, a plurality of floating sprocket wheels severally connected to said stress-sustaining parts, and a plurality of other sprocket wheels journaled in said block, one of said chains being arranged to engage in one plane a part of said floating sprocket wheels and a part of said other sprocket wheels and the other chain being arranged to similarly engage in a parallel adjacent plane the remainder of said floating sprocket wheels and said other sprocket wheels.

7. An equalizing device according to claim 6 in which the recited bearing block is a composite member including three spaced parallel plates secured together and the opposed sprocket wheels and other sprocket wheels are journaled in said plate on opposite sides of the center plate.

8. In an equalizing device for attaching a load to a plurality of suspension cables equipped with attaching members and including a corresponding plurality of floating pulleys connected to said suspension cables and engaging rigging connected to said load, means for severally connecting said pulleys to said cables including each a pull-bar formed at its upper end with a centrally orificed cross portion arranged to engage the associated attaching member, downwardly extending twin link portions connected to said cross portions, and a recessed cross portion at the lower end of said twin link portions having side sections formed with bearings arranged to pivotally support the associated pulley.

9. In an equalizing device for attaching a load to a set of hoisting cables, said device including a set of pull bars severally connected at their upper ends to said cables and equipped with pulleys at their lower ends, a safety frame arranged to cooperate as a stop with the lower ends of said pull bars, said frame including a center plate and opposite side plates spaced apart, and oppositely extending tie bolts arranged in two groups in spaced relation disposed on opposite sides of the center plate and arranged between adjacent pull bars as guides.

WILLIAM P. FROST.